(12) United States Patent
Zhang

(10) Patent No.: US 12,371,088 B2
(45) Date of Patent: Jul. 29, 2025

(54) GOLF CART

(71) Applicant: NINGBO WENTAI SPORT EQUIPMENT CO., LTD., Zhejiang (CN)

(72) Inventor: Sheng Zhang, Zhejiang (CN)

(73) Assignee: NINGBO WENTAI SPORT EQUIPMENT CO., LTD., Zhejiang (CN)

( * ) Notice: Subject to any disclaimer, the term of this patent is extended or adjusted under 35 U.S.C. 154(b) by 260 days.

(21) Appl. No.: 17/883,615

(22) Filed: Aug. 9, 2022

(65) Prior Publication Data

US 2023/0373547 A1 Nov. 23, 2023

(30) Foreign Application Priority Data

May 20, 2022 (CN) .......................... 202221218099.9

(51) Int. Cl.
*B62B 3/02* (2006.01)
*A63B 55/60* (2015.01)
(Continued)

(52) U.S. Cl.
CPC .............. *B62B 5/067* (2013.01); *A63B 55/60* (2015.10); *B62B 3/02* (2013.01); *B62B 3/12* (2013.01); *B62B 2202/404* (2013.01)

(58) Field of Classification Search
CPC .. B62B 5/067; B62B 3/02; B62B 3/12; B62B 7/068; B62B 2202/404; B62B 2205/003; A63B 55/60
See application file for complete search history.

(56) References Cited

U.S. PATENT DOCUMENTS 5,348,325 A * 9/1994 Abrams .................... B62B 1/12
    280/655
7,717,457 B2 * 5/2010 Bearup ................ A61K 31/409
    280/657
(Continued)

FOREIGN PATENT DOCUMENTS

CN   204337671 U  *  5/2015
CN   212914433       4/2021
(Continued)

OTHER PUBLICATIONS

"Search Report of Europe Counterpart Application", issued on May 17, 2023, p. 1-p. 8.
(Continued)

*Primary Examiner* — Steve Clemmons
(74) *Attorney, Agent, or Firm* — JCIPRNET

(57) ABSTRACT

A golf cart includes a handlebar module, an upper frame module, a front wheel module, a lower frame module and two rear wheel modules. The upper frame module is mounted on the lower frame module. The front wheel module is mounted at a front end of the lower frame module. The two rear wheel modules are mounted on left side and right side of a rear end of the lower frame module respectively. The handlebar module is mounted at an upper end of the upper frame module through a lock mechanism. A connecting-rod link mechanism is arranged between the upper frame module, the lower frame module, the front wheel module and the two rear wheel modules. A first connecting rod is arranged between the handlebar module and the lower frame module.

5 Claims, 4 Drawing Sheets

(51) Int. Cl.
   *B62B 3/12*   (2006.01)
   *B62B 5/06*   (2006.01)

(56)         References Cited

U.S. PATENT DOCUMENTS

| | | | |
|---|---|---|---|
| 8,191,920 B2 * | 6/2012 | Zhang | B62B 3/12 |
| | | | 280/DIG. 6 |
| 8,292,321 B2 * | 10/2012 | Liao | B62B 3/02 |
| | | | 280/651 |
| 9,381,931 B1 * | 7/2016 | Pan | B62B 3/025 |
| 10,556,608 B2 * | 2/2020 | Cheng | B62B 3/022 |
| 2014/0001734 A1 | 1/2014 | Wang | |
| 2019/0202487 A1 | 7/2019 | Cheng | |

FOREIGN PATENT DOCUMENTS

| | | | | | |
|---|---|---|---|---|---|
| CN | 212914433 U | * | 4/2021 | | |
| CN | 212941295 | | 4/2021 | | |
| CN | 212941295 U | * | 4/2021 | | |
| DE | 202018104863 | | 9/2018 | | |
| WO | 2014032394 | | 3/2014 | | |
| WO | WO-2014032394 A1 | * | 3/2014 | | A63B 55/60 |
| WO | WO-2015051591 A1 | * | 4/2015 | | B62B 3/02 |

OTHER PUBLICATIONS

"Office Action of Canada Counterpart Application", issued on Aug. 6, 2024, p. 1-p. 8.

* cited by examiner

GOLF CART

CROSS-REFERENCE TO RELATED APPLICATION

This application claims the priority benefit of China application serial no. 202221218099.9, filed on May 20, 2022. The entirety of the above-mentioned patent application is hereby incorporated by reference herein and made a part of this specification.

BACKGROUND

Technical Field

The invention relates to a ball cart, in particular to a golf cart.

Description of Related Art

Existing golf carts are easy to fold and provided with a few foldable portions, and still have a large size after being folded, thus being difficult to store. Golf carts that have a small size after being folded are generally provided with too many lock mechanisms, which need to be unlocked to unfold or fold a handlebar and a frame when the golf carts are unfolded or folded, which makes the operation complicated. These two types of golf carts bring a burden to customers in use and are inconvenient to use.

Chinese Invention Patent No. CN202021102865.6 discloses a golf cart with front and rear wheels capable of being unfolded and folded synchronously. According to the golf cart, a connecting-rod link mechanism is arranged between an upper frame module, a lower frame module, a front wheel module and two rear wheel modules, and when the upper frame module is folded towards the lower frame module, the front wheel module and the two rear wheel modules are driven to be folded synchronously through the link mechanism. The upper frame module, the lower frame module, the front wheel module and the two rear wheel modules of the golf cart can be folded or unfolded synchronously, a handlebar module can also be folded or unfolded, and the golf cart is small and compact after being folded, thus bringing better usage experience to customers. However, the golf cart is unfolded or folded through two steps, thus still being not easy enough to operate.

SUMMARY

The technical issue to be settled by the invention is to provide a golf cart that is small and compact after being folded, thus bringing better usage experience to customers, and allows a handlebar module, an upper frame module, a lower frame module, a front wheel module and two rear wheel modules to be unfolded and folded easily and rapidly through one step, thus being extremely easy to unfold and fold.

The technical solution adopted by the invention to settle the above technical issue is as follows: a golf cart comprises a handlebar module, an upper frame module, a front wheel module, a lower frame module and two rear wheel modules, wherein the upper frame module is mounted on the lower frame module and is able to rotate with respect to the lower frame module under the action of force, the front wheel module is mounted at a front end of the lower frame module and able to rotate with respect to the lower frame module under the action of force, the two rear wheel modules are mounted on a left side and a right side of a rear end of the lower frame module respectively, and the handlebar module is mounted at an upper end of the upper frame module through a lock mechanism; when the lock mechanism is locked, the handlebar module is fixed to the upper frame module; when the lock mechanism is unlocked, the handlebar module is able to rotate to be folded with respect to the upper frame module; a connecting-rod link mechanism is arranged between the upper frame module, the lower frame module, the front wheel module and the two rear wheel modules; when the upper frame module is folded towards the lower frame module, the front wheel module and the two rear wheel modules are driven to be folded synchronously by the upper frame module through the connecting-rod link mechanism; a first connecting rod is arranged between the handlebar module and the lower frame module, one end of the first connecting rod is mounted on the handlebar module and able to rotate with respect to the handlebar module under the action of force, the other end of the he first connecting rod is mounted on the lower frame module and able to rotate with respect to the lower frame module under the action of force; and when the upper frame module is folded towards the lower frame module, the first connecting rod drives the handlebar module to be synchronously folded towards the upper frame module.

The connecting-rod link mechanism comprises a slider, at least one second connecting rod, at least one third connecting rod, a left rear wheel link assembly and a right rear wheel link assembly, the slider is mounted on the lower frame module and is able to slide forward and backward on the lower frame module under the action of force, one end of the second connecting rod is mounted on the upper frame module and able to rotate with respect to the upper frame module under the action of force, the other end of the second connecting rod is mounted on the slider and able to rotate with respect to the slider under the action of force, one end of the third connecting rod is mounted on the slider and able to rotate with respect to the slider under the action of force, the other end of the third connecting rod is mounted at a rear end of the front wheel module and able to rotate with respect to the front wheel module under the action of force, the rear wheel module on the left is called a left rear wheel module, the rear wheel module on the right is called a right rear wheel module, the left rear wheel link assembly is used for synchronously folding the left rear wheel module, the right rear wheel link assembly is used for synchronously folding the right rear wheel module, the left rear wheel link assembly and the right rear wheel link assembly are of a bilaterally symmetric structure, the left rear wheel link assembly comprises a fourth connecting rod, a wheel active connecting rod and a wheel follower connecting rod, one end of the fourth connecting rod is mounted on the slider and able to rotate with respect to the slider under the action of force, and the other end of the fourth connecting rod is connected to the wheel active connecting rod and able to rotate with respect to the wheel active connecting rod under the action of force, one end of the wheel active connecting rod is mounted on the lower frame module and able to rotate with respect to the lower frame module under the action of force, and the other end of the wheel active connecting rod is mounted on the left rear wheel module and able to rotate with respect to the left rear wheel module under the action of force, and one end of the wheel follower connecting rod is mounted on the lower frame module and able to rotate with respect to the lower frame module under the action of force, and the other end of the wheel follower connecting rod is mounted on the left rear wheel module and able to rotate with respect to the left rear wheel module under the action of force.

A front wheel joint body is fixedly mounted on the front wheel module and the front wheel module is mounted on the lower frame module through the front wheel joint body, the front wheel joint body is able to rotate with respect to the lower frame module, the other end of the third connecting rod is mounted on the front wheel joint body, and a first elastic member is arranged between the front wheel joint body and the lower frame module, one end of the first elastic member is connected tot he front wheel joint body, and the other end of the first elastic member is connected to the lower frame module. In this structure, by setting the force direction of the first elastic member, the first elastic member can assist in folding or unfolding the golf cart, thus reducing the burden of users.

The first elastic member is a torsion spring.

A second elastic member is arranged between the upper frame module and the lower frame module, one end of the second elastic member is connected to the lower frame module, and the other end of the second elastic member is connected to the upper frame module. In this structure, by setting the force direction of the second elastic member, the second elastic member can assist in folding or unfolding the golf cart, thus reducing the burden of users.

The second elastic member is a torsion spring.

Compared with the prior art, the invention has the following advantages: the first connecting rod is arranged between the handlebar module and the lower frame module, one end of the first connecting rod is mounted on the handlebar module and is able to rotate with respect to the handlebar module under the action of force, and the other end of the first connecting rod is mounted on the lower frame module and is able to rotate with respect to the lower frame module under the action of force, and when the upper frame module is folded towards the lower frame module, the first connecting rod drives the handlebar module to be synchronously folded towards the upper frame module. When the golf cart is folded, the upper frame module is folded towards the lower frame module, at this moment, the first connecting rod drives the handlebar module to be folded towards the upper frame module, the connecting-rod link mechanism drives the front wheel module and the two rear wheel modules to be folded synchronously, and thus, the handlebar module, the upper frame module, the lower frame module, the front wheel module and the two rear wheel modules are folded synchronously. When the golf cart is unfolded, the upper frame module is moved away from the lower frame module, at this moment, the first connecting rod drives the handlebar module to be unfolded away from the upper frame module, the connecting-rod link mechanism drives the front wheel module and the two rear wheel modules to be unfolded synchronously at the same time, and thus, the handlebar module, the upper frame module, the lower frame module, the front wheel module and the two rear wheel modules are unfolded synchronously. Therefore, the golf cart is small and compact after being folded, which brings better usage experience to customers, and the handlebar module, the upper frame module, the lower frame module, the front wheel module and the two rear wheel modules can be unfolded and folded easily and rapidly through one step, so that the golf cart is extremely easy to unfold and fold.

DESCRIPTION OF THE EMBODIMENTS

Figure 1:
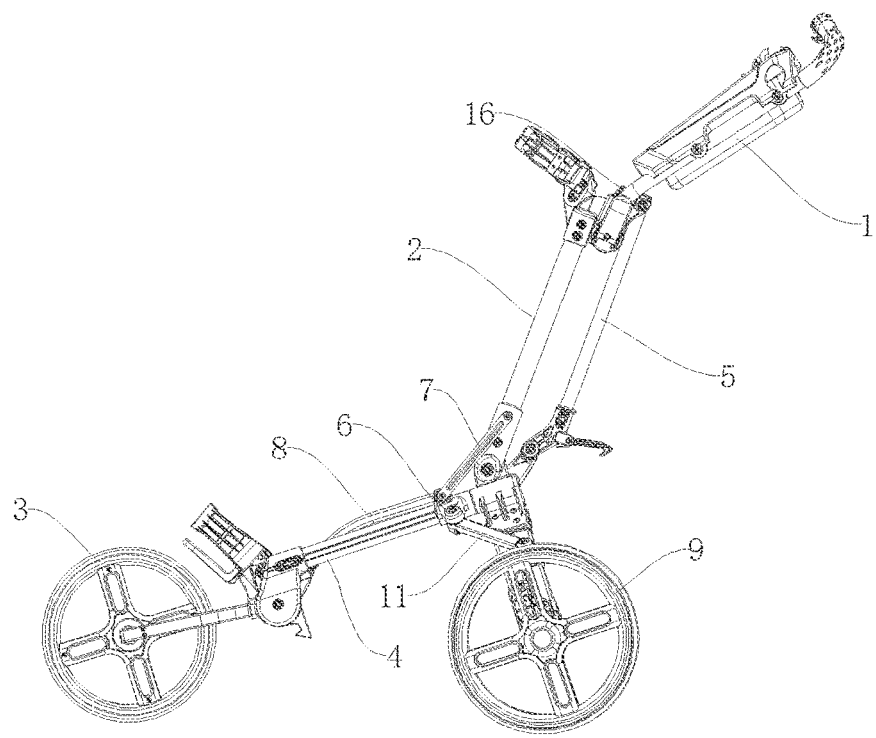
FIG. 1 is a side view of a golf cart in an unfolded state according to the invention.
Figure 2:
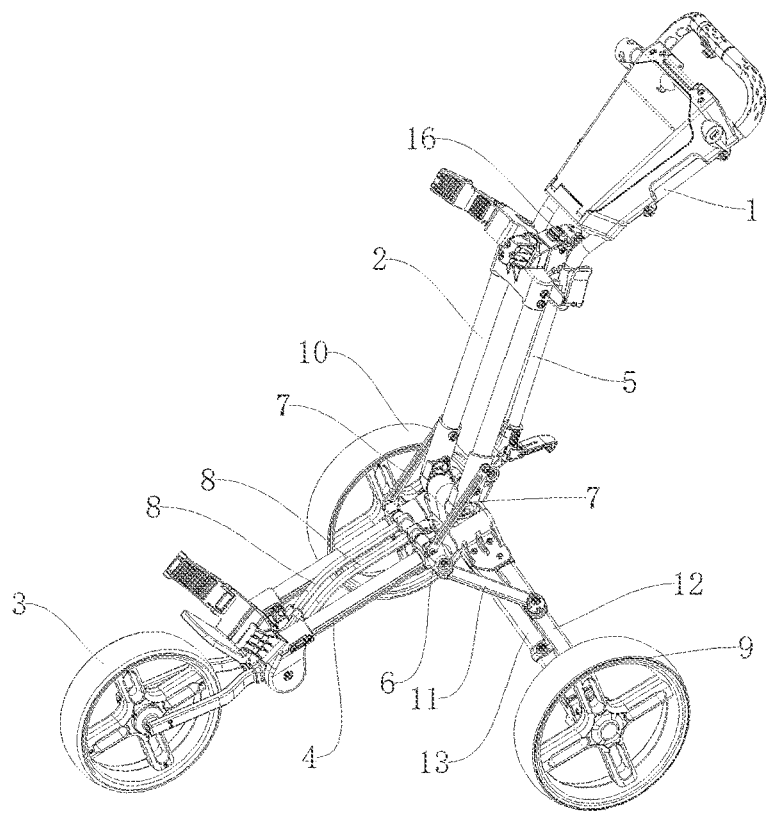
FIG. 2 is a second three-dimensional view of the golf cart in the unfolded state according to the invention.
Figure 3:
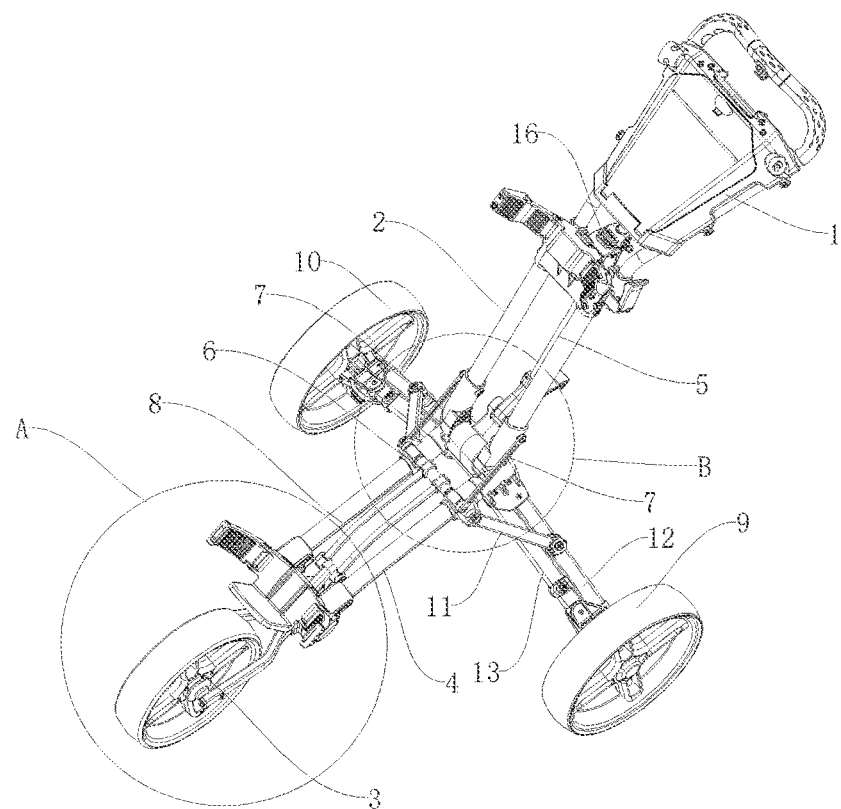
FIG. 3 is a third three-dimensional view of the golf cart in the unfolded state according to the invention.
Figure 4:
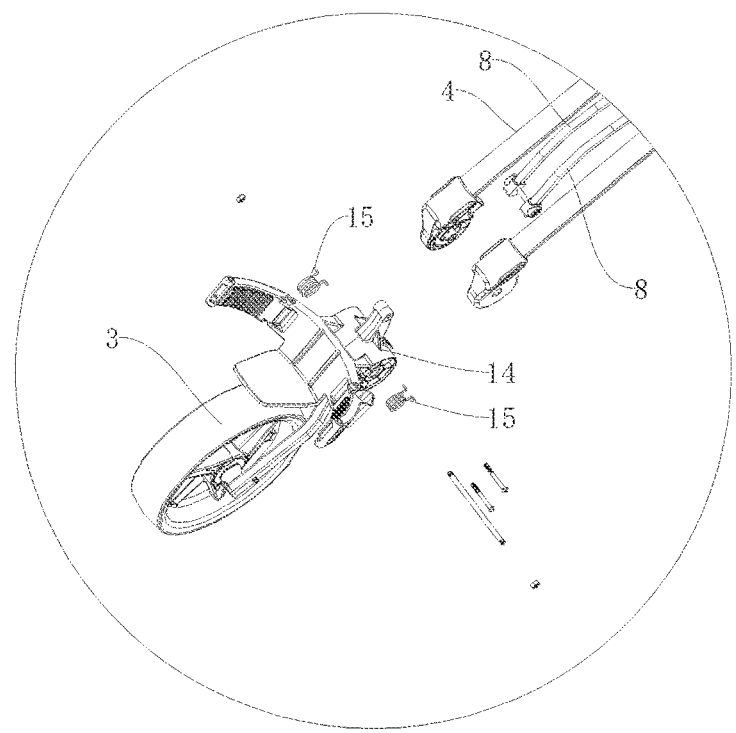
FIG. 4 is an exploded view of part A in FIG. 3.
Figure 5:
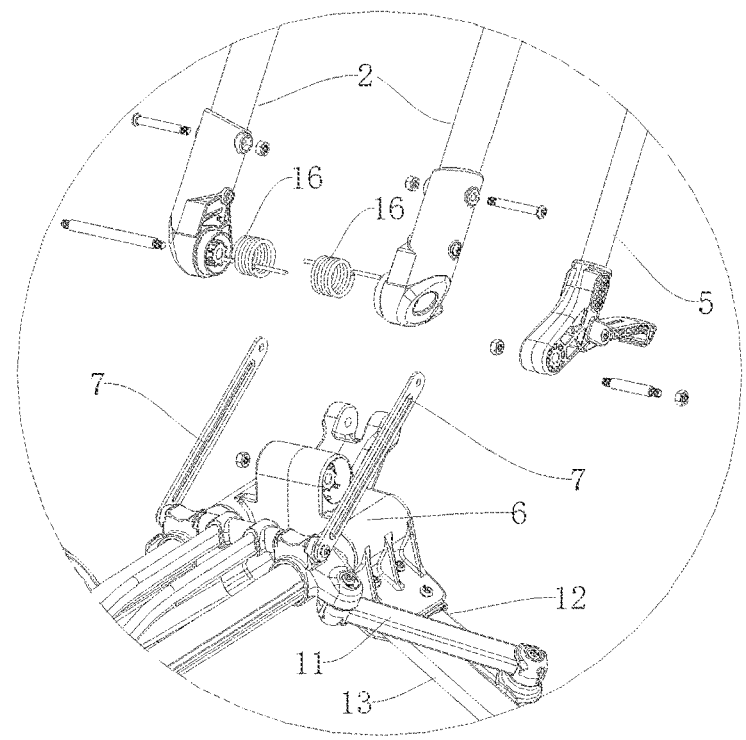
FIG. 5 is an exploded view of part B in FIG. 3.
Figure 6:
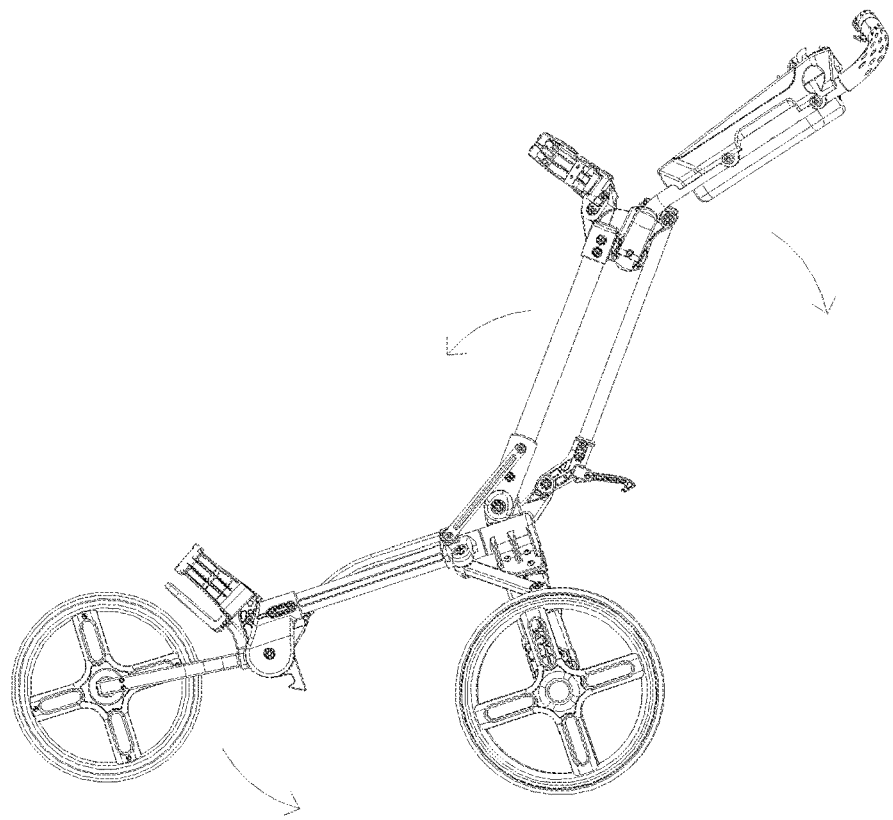
FIG. 6 is a first state diagram of the golf cart in the folding process according to the invention.
Figure 7:
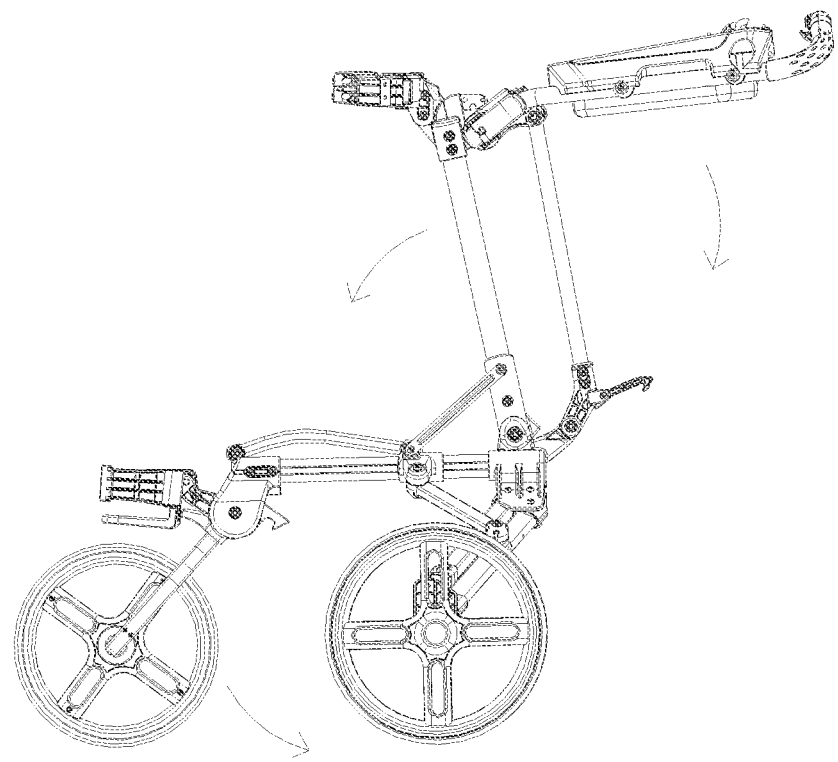
FIG. 7 is a second state diagram of the golf cart in the folding process according to the invention.
Figure 8:
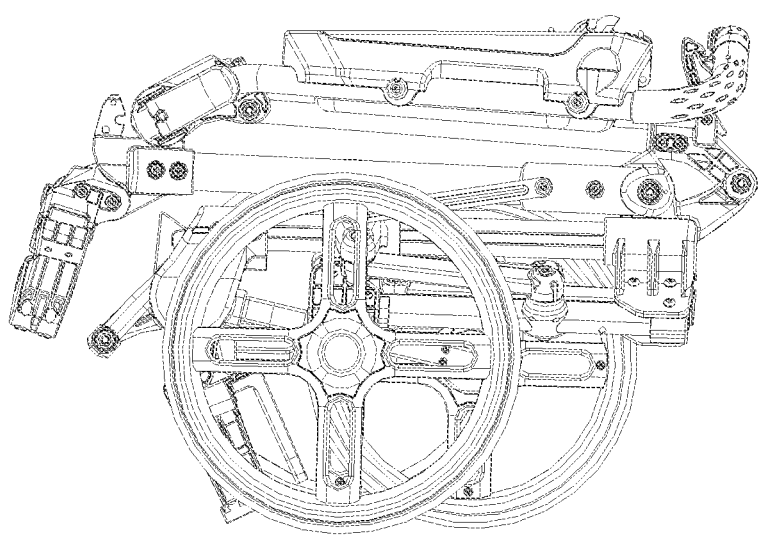
FIG. 8 is a state diagram of the golf cart in a folded state according to the invention.

The invention will be described in further detail below in conjunction with the accompanying drawings and embodiments.

Embodiment: as shown, a golf cart comprises a handlebar module 1, an upper frame module 2, a front wheel module 3, a lower frame module 4 and two rear wheel modules, wherein the upper frame module 2 is mounted on the lower frame module 4 and is able to rotate with respect to the lower frame module 4 under the action of force, the front wheel module 3 is mounted at a front end of the lower frame module 4 and is able to rotate with respect to the lower frame module 4 under the action of force, the two rear wheel modules are mounted on left side and right side of a rear end of the lower frame module 4 respectively, and the handlebar module 1 is mounted at an upper end of the upper frame module 2 through a lock mechanism 16; when the lock mechanism is locked, the handlebar module 1 is fixed to the upper frame module 2; when the lock mechanism 16 is unlocked, the handlebar module 1 is able to rotate to be folded with respect to the upper frame module 2; a connecting-rod link mechanism is arranged between the upper frame module 2, the lower frame module 4, the front wheel module 3 and the two rear wheel modules; when the upper frame module 2 is folded towards the lower frame module 4, the front wheel module 3 and the two rear wheel modules are driven by the upper frame module 2 through the connecting-rod link mechanism to be folded synchronously; a first connecting rod 5 is arranged between the handlebar module 1 and the lower frame module 4, one end of the first connecting rod 5 is mounted on the handlebar module 1 and is able to rotate with respect to the handlebar module 1 under the action of force, and the other end of the first connecting rod 5 is mounted on the lower frame module 4 and is able to rotate with respect to the lower frame module 4 under the action of force; and when the upper frame module 2 is folded towards the lower frame module 4, the first connecting rod 5 drives the handlebar module 1 to be synchronously folded towards the upper frame module 2.

In this embodiment, the connecting-rod link mechanism comprises a slider 6, at least one second connecting rod 7, at least one third connecting rod 8, a left rear wheel link assembly and a right rear wheel link assembly, wherein the slider 6 is mounted on the lower frame module 4 and is able to slide forward and backward on the lower frame module 4 under the action of force, one end of the second connecting rod 7 is mounted on the upper frame module 2 and is able to rotate with respect to the upper frame module 2 under the action of force, the other end of the second connecting rod 7 is mounted on the slider 6 and is able to rotate with respect to the slider 6 under the action of force, one end of the third connecting rod 8 is mounted on the slider 6 and is able to rotate with respect to the slider 6 under the action of force, the other end of the third connecting rod 8 is mounted at a rear end of the front wheel module 3 and is able to rotate with respect to the front wheel module 3 under the action of force, the rear wheel module on the left is called a left rear wheel module 9, the rear wheel module on the right is called a right rear wheel module 10, the left rear wheel link assembly is used for synchronously folding the left rear wheel module 9, the right rear wheel link assembly is used for synchronously folding the right rear wheel module 10, the left rear wheel link assembly and the right rear wheel link assembly are of a bilaterally symmetric structure, the left rear wheel link assembly comprises a fourth connecting rod 11, a wheel active connecting rod 12 and a wheel follower connecting rod 13, one end of the fourth connecting rod 11 is mounted on the slider 6 and is able to rotate with respect to the slider 6 under the action of force, the other end of the fourth connecting rod 11 is connected to the wheel active connecting rod 12 and is able to rotate with respect to the wheel active connecting rod 12 under the action of force, one end of the wheel active connecting rod 12 is mounted on the lower frame module 4 and is able to rotate with respect to the lower frame module 4 under the action of force, the other end of the wheel active connecting rod 12 is mounted on the left rear wheel module 9 and is able to rotate with respect to the left rear wheel module 9 under the action of force, one end of the wheel follower connecting rod 13 is mounted on the lower frame module 4 and is able to rotate with respect to the lower frame module 4 under the action of force, and the other end of the wheel follower connecting rod 13 is mounted on the left rear wheel module 9 and is able to rotate with respect to the left rear wheel module 9 under the action of force.

In this embodiment, a front wheel joint body 14 is fixedly mounted on the front wheel module 3 and he front wheel module 3 is mounted on the lower frame module 4 through the front wheel joint body 14, the front wheel joint body 14 is able to rotate with respect to the lower frame module 4, the other end of the third connecting rod 8 is mounted on the front wheel joint body 14, a first elastic member 15 is arranged between the front wheel joint body 14 and the lower frame module 4, one end of the first elastic member 15 is connected to the front wheel joint body 14, and the other end of the first elastic member 15 is connected to the lower frame module 4.

In this embodiment, the first elastic member 15 is a torsion spring.

In this embodiment, a second elastic member 16 is arranged between the upper frame module 2 and the lower frame module 4, one end of the second elastic member 16 is connected to the lower frame module 4, and the other end of the second elastic member 16 is connected to the upper frame module 2.

In this embodiment, the second elastic member 16 is a torsion spring.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A golf cart, comprising a handlebar module, an upper frame module, a front wheel module, a lower frame module and two rear wheel modules, the upper frame module being mounted on the lower frame module and being able to rotate with respect to the lower frame module under the action of force, the front wheel module being mounted at a front end of the lower frame module and being able to rotate with respect to the lower frame module under the action of force, the two rear wheel modules being mounted on a left side and a right side of a rear end of the lower frame module respectively, the handlebar module being mounted at an upper end of the upper frame module through a lock mechanism, wherein, when the lock mechanism is locked, the handlebar module is fixed to the upper frame module, when the lock mechanism is unlocked, the handlebar module is able to rotate to be folded with respect to the upper frame module; a connecting-rod link mechanism arranged between the upper frame module, the lower frame module, the front wheel module and the two rear wheel modules, wherein, when the upper frame module is folded towards the lower frame module, the front wheel module and the two rear wheel modules are driven to be folded synchronously by the upper frame module through the connecting-rod link mechanism, wherein a first connecting rod is arranged between the handlebar module and the lower frame module, one end of the first connecting rod is mounted on the handlebar module and able to rotate with respect to the handlebar module under the action of force, the other end of the first connecting rod is mounted on the lower frame module and able to rotate with respect to the lower frame module under the action of force; and when the upper frame module is folded towards the lower frame module, the first connecting rod drives the handlebar module to be synchronously folded towards the upper frame module, wherein, the first connecting rod is fastened with the handlebar module, wherein the connecting-rod link mechanism comprises a slider and at least one third connecting rod, the slider is mounted on the lower frame module and is able to slide forward and backward on the lower frame module under the action of force, and one end of the at least one third connecting rod is mounted on the slider and able to rotate with respect to the slider under the action of force, the other end of the at least one third connecting rod is mounted at a rear end of the front wheel module and able to rotate with respect to the front wheel module under the action of force, wherein a second elastic member is arranged between the upper frame module and the lower frame module, one end of the second elastic member is connected to the lower frame module, and the other end of the second elastic member is connected to the upper frame module, a rce direction of the second elastic member is adapted to fold the upper frame module and the lower frame module, wherein a first elastic member is arranged between the front wheel joint body and the lower frame module, one end of the first elastic member is connected to the front wheel joint body, and the other end of the first elastic member is connected to the lower frame module, a force direction of the first elastic member is adapted to fold the front wheel joint body and the lower frame module.

2. The golf cart according to claim 1, wherein the connecting-rod link mechanism comprises at least one second connecting rod, a left rear wheel link assembly and a right rear wheel link assembly, one end of the second connecting rod is mounted on the upper frame module and able to rotate with respect to the upper frame module under the action of force, the other end of the second connecting rod is mounted on the slider and able to rotate with respect to the slider under the action of force, the rear wheel module on a left is called a left rear wheel module, the rear wheel module on a right is called a right rear wheel module, the left rear wheel link assembly is used for synchronously folding the left rear wheel module, the right rear wheel link assembly is used for synchronously folding the right rear wheel module, the left rear wheel link assembly and the right rear wheel link assembly are a bilaterally symmetric structure, the left rear wheel link assembly comprises a fourth connecting rod, a wheel active connecting rod and a wheel follower connecting rod, one end of the fourth connecting rod is mounted on the slider and able to rotate with respect to the slider under the action of force, and the other end of the fourth connecting rod is connected to the wheel active connecting rod and able to rotate with respect to the wheel active connecting rod under the action of force, one end of the wheel active connecting rod is mounted on the lower frame module and able to rotate with respect to the lower frame module under the action of force, and the other end of the wheel active connecting rod is mounted on the left rear wheel module and able to rotate with respect to the left rear wheel module under the action of force, and one end of the wheel follower connecting rod is mounted on the lower frame module and able to rotate with respect to the lower frame module under the action of force, and the other end of the wheel follower connecting rod is mounted on the left rear wheel module and able to rotate with respect to the left rear wheel module under the action of force.

3. The golf cart according to claim 2, wherein the front wheel joint body is fixedly mounted on the front wheel module and the front wheel module is mounted on the lower frame module through the front wheel joint body, the front wheel joint body is able to rotate with respect to the lower frame module, the other end of the third connecting rod is mounted on the front wheel joint body.

4. The golf cart according to claim 3, wherein the first elastic member is a torsion spring.

5. The golf cart according to claim 1, wherein the second elastic member is a torsion spring.

* * * * *